United States Patent
Bastide et al.

(10) Patent No.: US 11,093,903 B2
(45) Date of Patent: Aug. 17, 2021

(54) MONITORING MEETING PARTICIPATION LEVEL

(71) Applicant: INTERNATIONAL BUSINESS MACHINES CORPORATION, Armonk, NY (US)

(72) Inventors: Paul R. Bastide, Ashland, MA (US); Yael Alkalay, Brookline, MA (US); Fang Lu, Billerica, MA (US); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 16/416,380

(22) Filed: May 20, 2019

(65) Prior Publication Data

US 2020/0372475 A1 Nov. 26, 2020

(51) Int. Cl.
| | |
|---|---|
| *G06Q 10/10* | (2012.01) |
| *H04N 7/15* | (2006.01) |
| *H04N 21/4788* | (2011.01) |
| *G06Q 10/06* | (2012.01) |
| *G10L 25/78* | (2013.01) |

(52) U.S. Cl.
CPC ... *G06Q 10/1095* (2013.01); *G06Q 10/06312* (2013.01); *H04N 7/15* (2013.01); *G10L 25/78* (2013.01); *H04M 2203/5081* (2013.01); *H04N 21/4788* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,682,704 | B2 * | 3/2014 | Nease, Jr. | G06Q 10/1095 705/7.19 |
| 8,971,511 | B2 | 3/2015 | Shaffer | |
| 9,843,768 | B1 * | 12/2017 | Negi | H04N 7/15 |
| 10,284,812 | B1 * | 5/2019 | Van Os | H04N 7/15 |
| 2005/0018828 | A1 * | 1/2005 | Nierhaus | H04L 29/00 379/202.01 |

(Continued)

FOREIGN PATENT DOCUMENTS

WO 2018151992 A1 8/2018

OTHER PUBLICATIONS

Disclosed Anonymously, "Predictive Time Management for Shared Presentation Sessions", IP.com No. IPCOM000235845D, Mar. 14, 2014, pp. 1-5.

(Continued)

*Primary Examiner* — Crystol Stewart
(74) *Attorney, Agent, or Firm* — John Noh

(57) ABSTRACT

A method, a computer program product, and a computer system determine participation levels of participants in a meeting. The method includes determining a characteristic of a first one of the participants. The method includes identifying a meeting topic to be discussed during the meeting. The method includes determining an expected participation level of the first participant based on the characteristic and the meeting topic. The method includes determining an actual participation level of the first participant during the meeting related to the meeting topic. The method includes determining whether the actual participation level of the first participant has met the expected participation level.

20 Claims, 6 Drawing Sheets

(56) References Cited

U.S. PATENT DOCUMENTS

| | | | |
|---|---|---|---|
| 2009/0006608 A1* | 1/2009 | Gupta | G06Q 10/10 709/224 |
| 2014/0344702 A1 | 11/2014 | Edge | |
| 2015/0084518 A1* | 3/2015 | Takahashi | H05B 47/12 315/152 |
| 2015/0110259 A1* | 4/2015 | Kaye | H04W 4/023 379/202.01 |
| 2015/0181020 A1* | 6/2015 | Fitzsimmons | H04M 3/42221 379/67.1 |
| 2016/0019485 A1* | 1/2016 | Hosabettu | G06Q 10/1095 705/7.19 |
| 2016/0073054 A1* | 3/2016 | Balasaygun | H04L 12/1813 348/14.08 |
| 2016/0086104 A1* | 3/2016 | Wouhaybi | G06Q 50/01 705/5 |
| 2016/0124909 A1 | 5/2016 | Basson | |
| 2016/0261655 A1* | 9/2016 | Aggarwal | G06Q 10/06311 |
| 2017/0127021 A1* | 5/2017 | Frank | H04N 7/15 |
| 2017/0302466 A1 | 10/2017 | Stoner | |
| 2017/0308866 A1* | 10/2017 | Dotan-Cohen | H04L 43/0876 |
| 2018/0189743 A1* | 7/2018 | Balasubramanian | G06Q 10/1095 |
| 2018/0227343 A1* | 8/2018 | Borghetti | H04L 65/403 |
| 2019/0116338 A1* | 4/2019 | Ma | H04N 21/4788 |
| 2019/0238682 A1* | 8/2019 | Christiano | H04M 3/563 |
| 2020/0160278 A1* | 5/2020 | Allen | G06F 16/35 |

OTHER PUBLICATIONS

Mell et al., "The NIST Definition of Cloud Computing", National Institute of Standards and Technology, Special Publication 800-145, Sep. 2011, pp. 1-7.

* cited by examiner

MONITORING MEETING PARTICIPATION LEVEL

BACKGROUND

The exemplary embodiments relate generally to monitoring a participation level of participants in a meeting, and more particularly to determining whether the participation levels are at an expected amount.

A meeting may be performed in person where the participants of the meeting gather in a common location and/or electronically where the participants log in remotely through a meeting client using video and/or audio inputs and outputs. The meeting may include any number of participants. When using the electronic meeting such as a web meeting, the number of participants may be significant, such as ten or more participants. Select participants may be expected to be dominant during a specific meeting. For example, the meeting's topic may be primarily relevant to a small number of participants such that the other participants are expected to mostly listen and receive assignments based on the results of the meeting. During the meeting, the dominant participants may be unaware or occupy too much of the conversation that the other participants may remain silent when they may provide valuable inputs and contribute to the output of the meeting.

SUMMARY

The exemplary embodiments disclose a method, a computer program product, and a computer system for determining participation levels of participants in a meeting. The method comprises determining a characteristic of a first one of the participants. The method comprises identifying a meeting topic to be discussed during the meeting. The method comprises determining an expected participation level of the first participant based on the characteristic and the meeting topic. The method comprises determining an actual participation level of the first participant during the meeting related to the meeting topic. The method comprises determining whether the actual participation level of the first participant has met the expected participation level.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
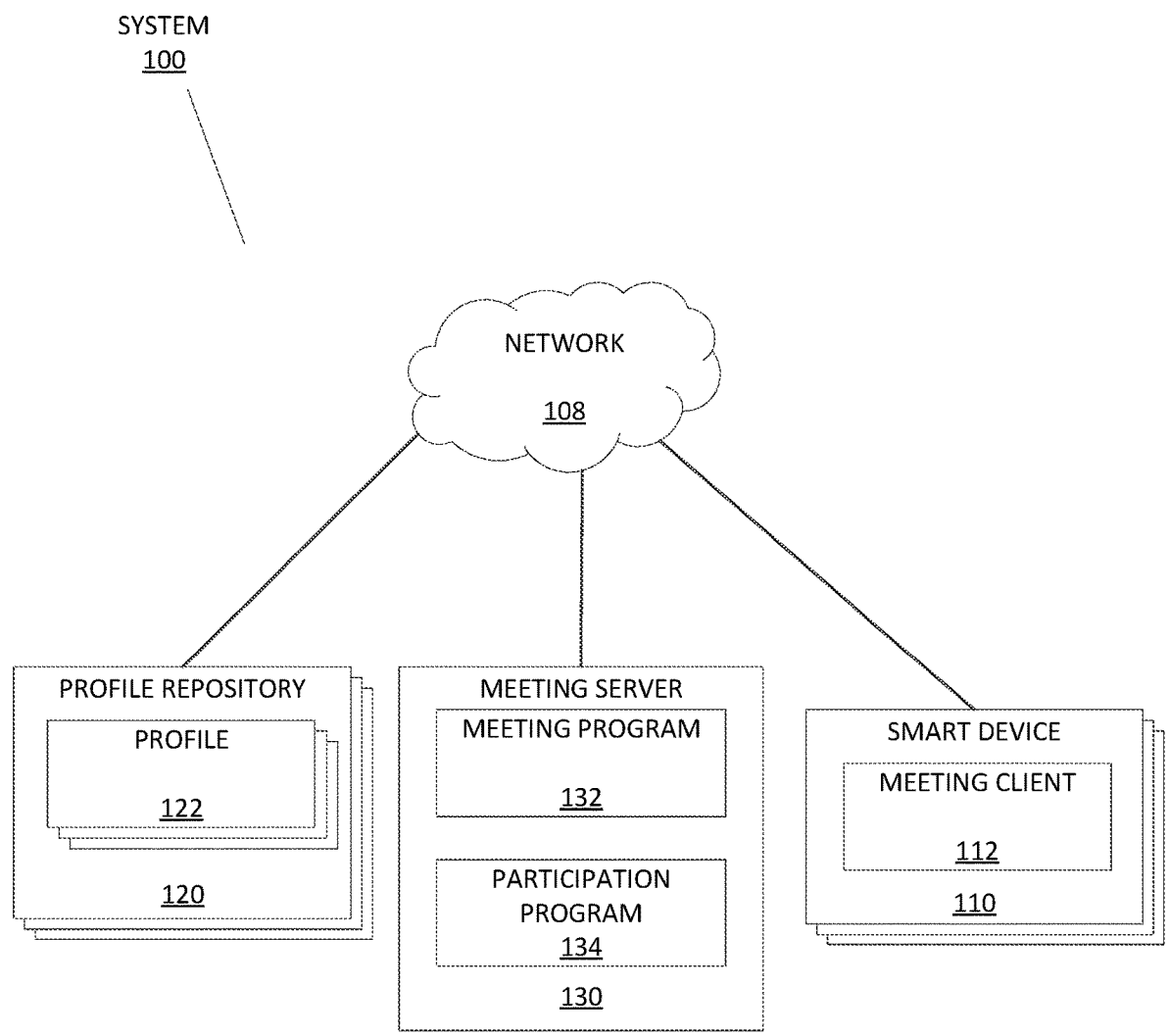
FIG. 1 depicts an exemplary schematic diagram of a meeting participation evaluation system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for monitoring a participation level of participants of a meeting. As will be described in greater detail herein, the exemplary embodiments are configured to determine when the participation level of a selected one of the participants is not at an expected participation level. Thus, the exemplary embodiments may monitor a progress of the meeting so that the participants contribute an expected amount (e.g., the expected participation level). Key benefits of the exemplary embodiments may include engaging all of the participants of the meeting to respective expected participation levels so that the meeting is conducted in an efficient manner. Detailed implementation of the exemplary embodiments follows.

Conventional approaches to running a meeting may allow participants to engage in the conversation when an opportunity arises or when an opportunity is presented to the participants. For example, a queue may be formed so that a participant may speak in turn. Such approaches utilize a timed based, equal opportunity procedure that focuses on providing time to each participant to contribute to the meeting. However, providing time to a participant who is not expected to reasonably contribute to the meeting and/or detracting time from a participant who is expected to substantially contribute to the meeting results in an inefficient running of the meeting. The exemplary embodiments are configured to dynamically manage the time allocated for participants to speak in the meeting based on the expertise of the participants for the topic of the meeting. In this manner, the exemplary embodiments may improve an engagement level of the meeting participants, improve a productivity of the meeting participants, create a more pleasant meeting atmosphere, etc. The exemplary embodiments may also enable the meeting to stay on track, without significant deviation from the intended topic. For example, the meeting may deviate for any of a variety of reasons. The exemplary embodiments may refocus the meeting as participants having certain expertise related to the intended topic are provided time to contribute so that the conversation returns to the intended topic.

The exemplary embodiments are described with regard to monitoring participation levels of participants in a meeting. However, the exemplary embodiments being directed to the meeting and its participants are only illustrative. The exemplary embodiments may be implemented or modified to be used in other scenarios involving a plurality of individuals who are collaborating to achieve an intended target and/or discuss a particular topic. For example, the exemplary embodiments may be implemented for a project involving a plurality of project members where each project member may have individual skill sets. The exemplary embodiments may monitor a progress of the project to ensure that each project member contributes an expected contribution amount based on their expertise and/or skill set.

The exemplary embodiments are also described with regard to utilizing information related to an expertise and/or skill set of a participant to determine an expected participation level of the patient. However, the exemplary embodiments may utilize any characteristic of the participant in determining the expected participation level. For example, in addition to an expertise or a skill set, the characteristic may be any experience, personality trait, association, member status, historical link, etc. that may indicate a potential contribution toward a meeting topic.

FIG. 1 depicts a meeting participation evaluation system 100, in accordance with the exemplary embodiments. According to the exemplary embodiments, the meeting participation evaluation system 100 may include one or more smart devices 110, one or more profile repositories 120, and a meeting server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the meeting participation evaluation system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the meeting participation evaluation system 100 that do not utilize the network 108.

In the exemplary embodiments, the smart device 110 may include a meeting client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the meeting client 112 may act as a client in a client-server relationship and may be a software, hardware, and/or firmware based application capable of joining a meeting via the network 108. In embodiments, the meeting client 112 may operate as a user interface allowing a user to interact with one or more components of the meeting participation evaluation system 100, and utilize various wired and/or wireless connection protocols for data transmission and exchange associated with joining the meeting, including Bluetooth, 2.4 gHz and 5 gHz internet, near-field communication, Z-Wave, Zigbee, etc.

When the smart device 110 is associated with a user, the meeting client 112 may be configured to provide, to the user, a user interface of the meeting that is being joined. For example, the meeting client 112 may generate a video and/or audio interface. The video interface may allow the user of the smart device 110 to view other participants of the meeting and/or transmit a view of the user to the other participants while the audio interface may allow the user of the smart device 110 to receive audio output from other participants of the meeting and/or transmit audio input of the user to the other participants. When the meeting is run in person as well as remotely, the user joining the meeting remotely and the smart device 110 may be in a remote location. Thus, in the user interface, the meeting client 112 may provide a video and/or audio interface of the meeting room for participants who joined the meeting in person. When the smart device 110 is associated with a location, the meeting client 112 may perform substantially similar operations and provide the user interface of the meeting to participants convened at the location (e.g., a video and/or audio output of a user joining the meeting remotely, a video and/or audio output of another meeting room for further participants convening at a different location, etc.). The meeting client 112 may perform similar functions with respect to hosting project collaborations and the like.

In the exemplary embodiments, the profile repository 120 may include one or more profiles 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 120 is shown as a single device, in other embodiments, the profile repository 120 may be comprised of a cluster or plurality of electronic devices, in a modular manner, etc., working together or working independently. While the profile repository 120 is also shown as a separate component, in other embodiments, the profile repository 120 may be incorporated with one or more of the other components of the meeting participation evaluation system 100. For example, the profile repository 120 may be incorporated in the meeting server 130. Thus, access to the profile repository 120 by the meeting server 130 may be performed locally. In another example, the profile repository 120 may be incorporated in the smart device 110 (e.g., each smart device 110 has a profile repository 120 including at least the profile 122 of the user who is respectively associated). Thus, access to the profile repository 120 and to a specific one of the profiles 122 may be performed through a transmission from the smart device 110. The profile repository 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the profiles 122 may be associated with respective members of a population of users who may join meetings. The profiles 122 may be populated with information that is manually provided by the respective users, endorsed by other users, etc. The profiles 122 may also be populated with information that is automatically determined based on various types of available information such as an educational history, an employment history, etc. The profiles 122 may include any information related to the users. For example, when the population is related to a corporation, the profiles 122 may include information indicating a job title, responsibilities of the job position, projects on which the user is a part, a primary location of the position, a reporting hierarchy, etc. In another example, the profiles 122 may include information indicative of expertise in various fields, technical or non-technical. The technical expertise may be, for example, a technical discipline, a scientific practice, etc. The non-technical expertise may be, for example, organizational skills, leadership, public speaking, etc.

In the exemplary embodiments, the meeting server 130 may include a meeting program 132 and a participation program 134 and act as a server in a client-server relationship with the meeting client 112 as well as be in a communicative relationship with the profile repository 120. The meeting server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the meeting server 130 is shown as a single device, in other embodiments, the meeting server 130 may be comprised of a cluster or plurality of computing devices, working together or working independently. The meeting server 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the meeting program 132 may be a software, hardware, and/or firmware application configured to host a meeting for the participants of the meeting. The meeting program 132 may host the meeting in a passive manner and/or an active manner. In the passive manner, the meeting may be performed at least partially in person. For example, there may be one or more meeting rooms at respective predetermined locations where one or more participants may convene at each location. The meeting program 132 may host an overall meeting by linking the one or more individual meeting rooms to other meeting rooms, both physical meeting rooms and electronic meeting rooms, to create a combined meeting room where all participants are part of the same overall meeting. When a physical meeting room is used, a smart device 110 may be at the location of the meeting room and associated therewith, instead of with an individual user. In this manner, the meeting client 112 of this smart device 110 for the physical meeting room may be used in the server-client relationship with the meeting server 130. In the active manner, the meeting may be performed at least partially remotely. For example, a user using the smart device 110 may utilize the meeting client 112 to remotely join the meeting. Thus, the meeting program 132 may create a respective electronic meeting room for each user joining the meeting remotely. The meeting program 132 may link the electronic meeting rooms to the overall meeting. When more than one meeting room (e.g., physical or electronic) is used, the meeting program 132 may be configured to exchange video, audio, text, documentation data, etc. among the participants of the meeting.

In the exemplary embodiments, the participation program 134 may be a software, hardware, and/or firmware application configured to monitor the meeting and the activity of the participants of the meeting. The participation program 134 may identify the participants of the meeting and determine any corresponding expertise associated with each participant based on the profiles 122 included in the profile repository 120 as well as any other information that may be available or provided. The participation program 134 may identify one or more topics that are to be covered in the meeting. By monitoring a progress of the meeting and based on the identified topics, the participation program 134 may determine an expected participation level that each participant is to contribute to the meeting. The expected participation level may be assessed by verbal or written contributions (e.g., speech or text from the participant), non-verbal contributions (e.g., providing documentation, updating graphs being shown, etc.), or any other activity that may be construed as a contribution to the meeting.

As the meeting progresses, the participation program 134 may determine when one or more participation levels of the participants are not meeting the corresponding expected participation level. When the participation level of a participant is not meeting the corresponding expected participation level, the participation program 134 may perform a subsequent action to raise the participation level of the participant toward the corresponding expected participation level. For example, the participation program 134 may generate a user interface including each participation level with a corresponding indication as to whether the participation level is at the expected participation level or under the expected participation level (e.g., a color coded scheme). In another example, the participation program 134 may generate an alert or notification to only the participant or to all participants that further contribution is expected from the participant. In a further example, the participation program 134 may reconfigure the video and/or audio inputs and outputs to emphasize contributions from the participant (e.g., lowering audio inputs from other participants while raising an audio output of the participant, raising an illumination of the participant while dimming an illumination of other participants, etc.).

The participation program 134 may further be configured to identify when the participants are contributing during the meeting. For example, the participation program 134 may identify the participant through text based contributions where the identity corresponds to an originating device (e.g., the smart device 110 on which a user has logged into the meeting client 112 to join the meeting). In another example, the participation program 134 may be configured with voice recognition software that identifies the participant through audio inputs. When the participant is alone (e.g., joining the meeting remotely), the participating program 134 may also identify the participant based on the originating device. When the participant is in a meeting room with other participants, the participating program 134 may isolate the participants voice, analyze the voice, and determine the identity of the participant. In a further example, the participation program 134 may utilize video inputs to identify when a participant is contributing (e.g., determining when a mouth of a participant is moving that corresponds to a particular audio input, determining when a participant is gesturing, etc.). By determining the participant in the video input, the contribution may be linked to the participant.

Figure 2:
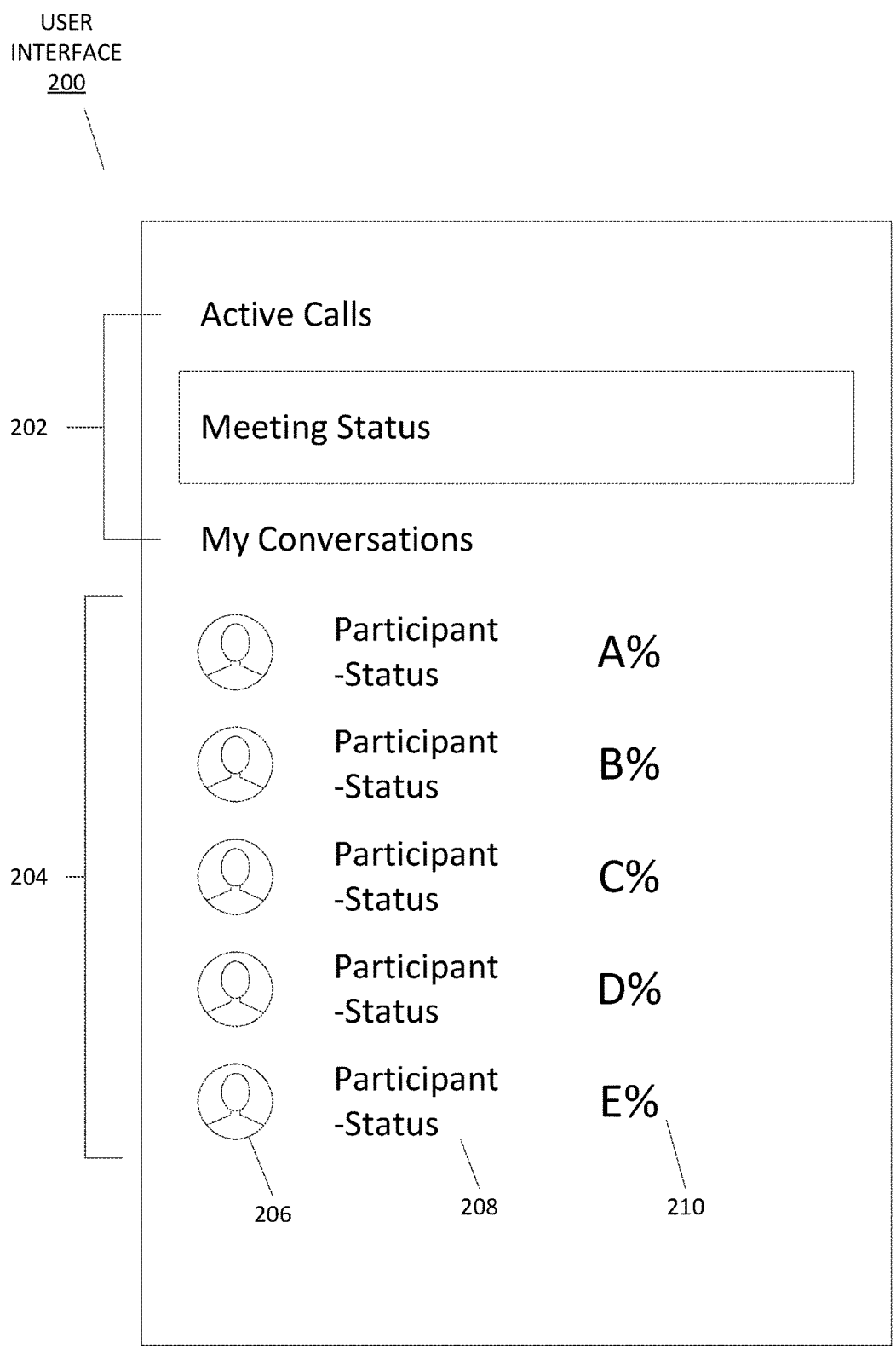
FIG. 2 depicts an exemplary user interface providing information of a meeting and its participants, in accordance with the exemplary embodiments.

As noted above, the participation program 134 may generate a user interface that includes the participation levels of the participants of a meeting. FIG. 2 illustrates an exemplary user interface 200 providing information of a meeting and its participants, in accordance with the exemplary embodiments.

In the exemplary embodiments, the user interface 200 may display various types of information. For example, as illustrated, the user interface 200 may include a status block 202 and a participant list 204. The status block 202 may provide information regarding any meeting in which the user may have joined (e.g., meeting is active, meeting has ended, meeting will begin soon, etc.), the type of meeting that has been joined (e.g., video conference, audio only conference, etc.), etc. The participant list 204 may identify the participants who are currently in the meeting. The participant list 204 may include a portrait 206, a participant status 208, and a participation level 210 for each participant. The portrait 206 may show an image of the participant (e.g., a preselected image, a captured image, etc.). The participant status 208 may identify the name of the participant and personal statuses (e.g., online, available, busy, location, video mode, audio mode, etc.).

The participation level 210 may indicate the amount of participation or contribution that the participant has had in the meeting from a start time to a current time. The participation level 210 may be represented as a percentage of the participation of a participant relative to a total amount of participation from the participants (e.g., a sum of the participation levels 210 for the participants is 100%). The participation program 134 may determine an expected participation level for each participant and may include an indication in the user interface 200 with respect to a specific participation level 210 is under the corresponding expected participation level. For example, the participation level 210 may be shown in a first color (e.g., black) to indicate that the participation level 210 is at least the expected participation level of the participant. In another example, the participation level 210 may be shown in a second color (e.g., red) to indicate that the participation level 210 is under the expected participation level of the participant. In another exemplary embodiment, the participation level 210 may also show the expected participation level (not shown) for each participant. Since the expected participation level may be a dynamic value that is adjusted as the meeting progresses, the user interface 200 may update the expected participation level that is shown as a new calculation is performed, at predetermined intervals, etc.

Figure 3:
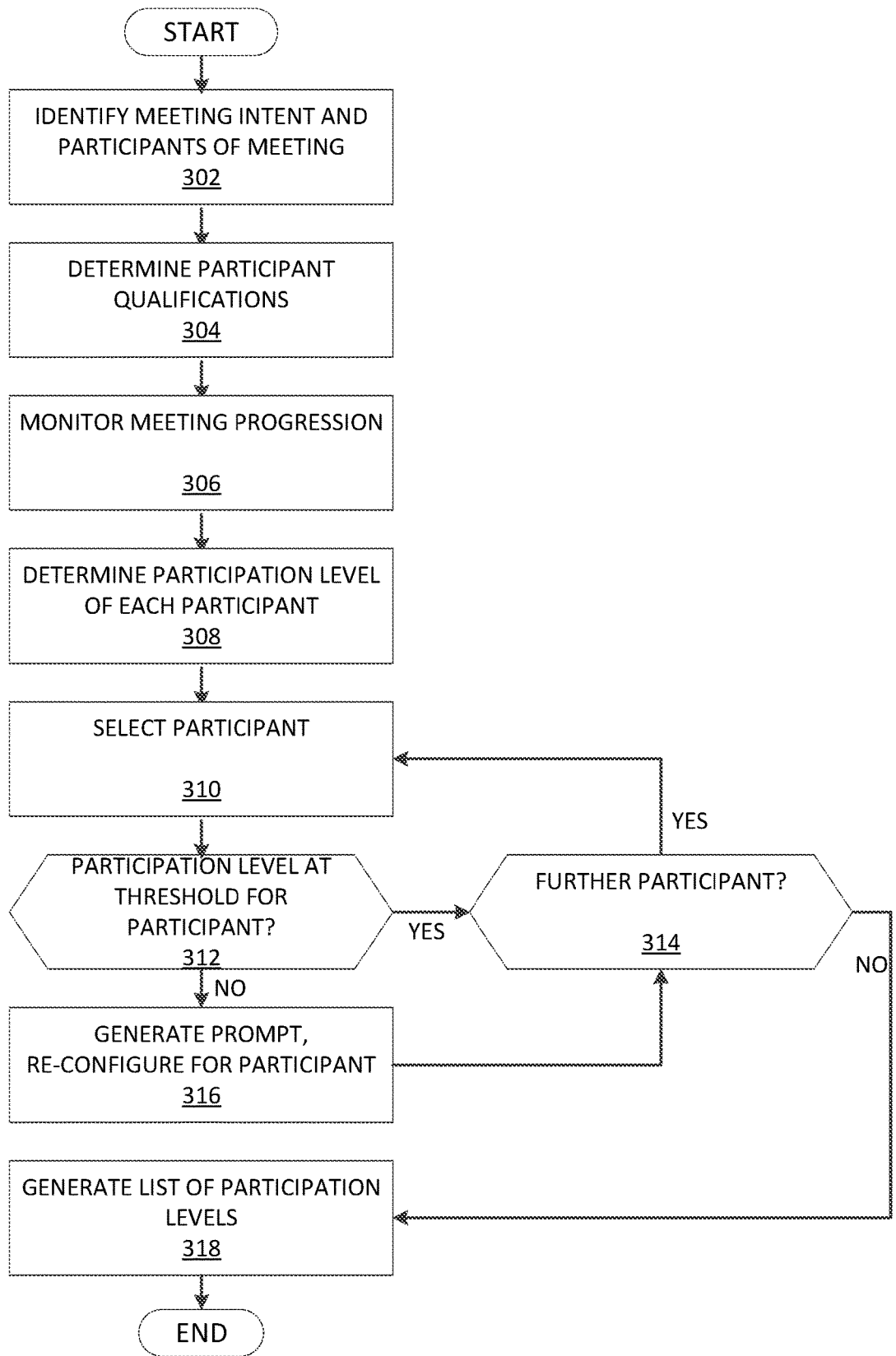
FIG. 3 depicts an exemplary flowchart illustrating the operations of a participation program 134 of the meeting participation evaluation system 100 in assessing participation levels of participants of a meeting, in accordance with the exemplary embodiments.

FIG. 3 illustrates the operations of the participation program 134 of the meeting participation evaluation system 100 in assessing participation levels of participants of a meeting, in accordance with the exemplary embodiments. Select operations of the participation program 134 may be performed prior to the meeting starting while other operations of the participation program 134 may be performed during the meeting.

The participation program 134 may identify a meeting intent or meeting topic as well as identify the participants of the meeting (step 302). The participation program 134 may access any available information to ascertain the meeting topic. For example, the participation program 134 may extract agenda information of the meeting from calendar invitations or emails exchanged to schedule the meeting. In another example, the participation program 134 may utilize other sources of information that may indicate or provide insight as to the meeting topic (e.g., emails, chat sessions, documents, etc.). The participation program 134 may identify the meeting topic in a plurality of ways. For example, the participation program 134 may determine topics that are to be discussed during the meeting, goals to be achieved by the end of the meeting, etc. A participant (e.g., meeting leader) may also manually enter the meeting topic to be discussed in the meeting.

The participation program 134 may also utilize substantially similar information to identify the participants of the meeting. For example, the participation program 134 may identify the participants as users included in an email that is sent to schedule the meeting. The participation program 134 may be configured to determine when a user included in the email may be included for administrative or corporate practice reasons so that such users may be omitted from the list of participants. A participant (e.g., meeting leader) may also manually enter the participants who will be attending the meeting.

The participation program 134 may identify the participants as an ongoing operation. For example, the participation program 134 may generate a first participant list preliminarily, before the meeting is scheduled. As will be described below, the identification of the participants may enable the participation program 134 to perform subsequent operations. In another example, the participation program 134 may update the first participant list when the meeting has started and as the meeting progresses. Accordingly, the participation program 134 may add any additional participants who may join the meeting or remove any participant who did not make the meeting. The participation program 134 may continue to update the participant list throughout the meeting to reflect a most current list of participants still in the meeting.

The participation program 134 may determine participant qualifications (step 304). The participant qualifications may include any expertise or skill set related to the meeting topic that each participant may possess. The participation program 134 may access the profiles 122 of the identified participants and/or utilize any other information (e.g., the information used to identify the meeting intent and/or participants) to ascertain the expertise of the participants.

Based on the identified meeting topics and the preliminary participant list along with the corresponding expertise, the participation program 134 may determine a preliminary expected participation level for each participant of the meeting. For example, the meeting may be directed toward a software release. The meeting topic may include a programming issue with the software that requires attention. The participation program 134 may identify the one or more participants who may resolve the issue (e.g., the participant(s) having the expertise in the programming language used for the software). The participation program 134 may determine that these one or more participants are expected to contribute for this issue. According to an exemplary embodiment, the participation program 134 may evenly divide an overall participation level by the number of participants (e.g., five participants have individual expected participation levels of 20%). The participation program 134 may then modify the expected participation levels based on the expertise and the meeting topics. For example, if one participant has the expertise to address the above noted issue, the participation program 134 may increase the expected participation level of this participant while decreasing the participation levels of the remaining participants. In another example, one participant may be the lead of the meeting. The participation program 134 may increase the expected participation level of the lead participant while decreasing the participation levels of the remaining participants. The participation program 134 may continue this process until the meeting topics have been addressed and the preliminary expected participation levels have been determined.

The participation program 134 may determine the expected participation levels of the participants using a flexibility standard. For example, under a low flexibility standard and the expected participation levels being measured as a percentage, the sum of the expected participation levels may total or be substantially near 100%. Thus, the participation program 134 may assume that the meeting will be run to cover the meeting topics without deviation. In another example, under a customary flexibility standard and the expected participation levels being measured as a percentage, the expected participation levels may incorporate a margin of error (e.g., +/−5%), a margin to compensate for unanticipated contributions, a space for other discussions that may occur in the meeting, etc. Thus, the participation program 134 may anticipate topics of discussion during the meeting outside the expected meeting topics.

The meeting may then start at the scheduled time. As a result of the meeting starting, the participation program 134 may monitor a progression of the meeting (step 306). With the participants of the meeting being dynamically determined, the participation program 134 may update the participants with the individuals who have joined the meeting (e.g., any additions, any absentees, etc.). In monitoring the progression of the meeting, the participation program 134 may determine the participation level of each participant (step 308). The participation program 134 may track contributions provided by each participant through audio inputs, entered text, displayed documentation, etc. The participation program 134 may utilize various techniques to determine how the contributions correspond to the meeting topics. For example, for audio inputs that are spoken by the participants, the participation program 134 may determine the spoken words and apply a natural language processing operation to break down the audio inputs and identify the relevance to the meeting topics. In another example, for entered text that is typed in by the participants, the participation program 134 may also utilize the natural language processing operation to identify the relevance to the meeting topics. In a further example, for documentation or other data that is shared among the participants, the participation program 134 may analyze the content included therein to identify the relevance to the meeting topics. Through analysis of the contributions, the participation program 134 may determine an actual participation level of each participant.

As the meeting progresses, the participation program 134 may update the expected participation levels of the participants from the values determined for the preliminary expected participation levels. Instead of modifying initial values, the participation program 134 may also be configured to determine the expected participation levels dynamically after the meeting has started. The meeting may take different directions in accordance with the meeting topics that are to be covered. Thus, the participation program 134 may dynamically determine the expected participation levels that coincide with how the meeting progresses.

The participation program 134 may select one of the participants for analysis (step 310). The participation program 134 may determine whether the selected participant has contributed to the meeting in an expected manner or to a threshold (decision 312). For example, the participation program 134 may compare the actual participation level of the selected participant to the expected participation level of the selected participant. If the actual participation level is less than the expected participation level of the selected participant (decision 312, "NO" branch), the participation program 134 generates a prompt, alert, or notification, and/or reconfigures the settings of the selected participant (e.g., boosting microphone of the selected participant when speaking commences) (step 316). For example, the prompt may notify the selected participant to contribute further to the conversation of the meeting. The participation program 134 may further indicate the meeting topic and/or specific reason as to why the selected participant is instructed to further contribute. In monitoring the progress of the meeting and determining a place in the meeting, the participation program 134 may be configured to instruct the selected participant to contribute in a seamless manner (e.g., along a flow of the meeting conversation).

If the actual participation level is at least the expected participation level of the selected participant (decision 312, "YES" branch), the participation program 134 determines if there are further participants in the meeting (decision 314). If there is at least one further participant (decision 314, "YES" branch), the participation program 134 selects a further participant (step 310). The participation program 134 may continue this process until all the participants have been analyzed. When no further participants who have not been analyzed remain (decision 314, "NO" branch), the participation program 134 generates a list of the participation levels of the participants such as the participation list 204 (step 318).

The exemplary embodiments are configured to aid in running a meeting involving a plurality of participants. By identifying the participants, the expertise of the participants or the manner by which the participants are capable of contributing to the meeting, and the purpose of the meeting, the exemplary embodiments may determine an expected participation level of each participant. When a participant's contribution falls below the expected participation level, the exemplary embodiments may allocate time for the participant to contribute further.

Figure 4:
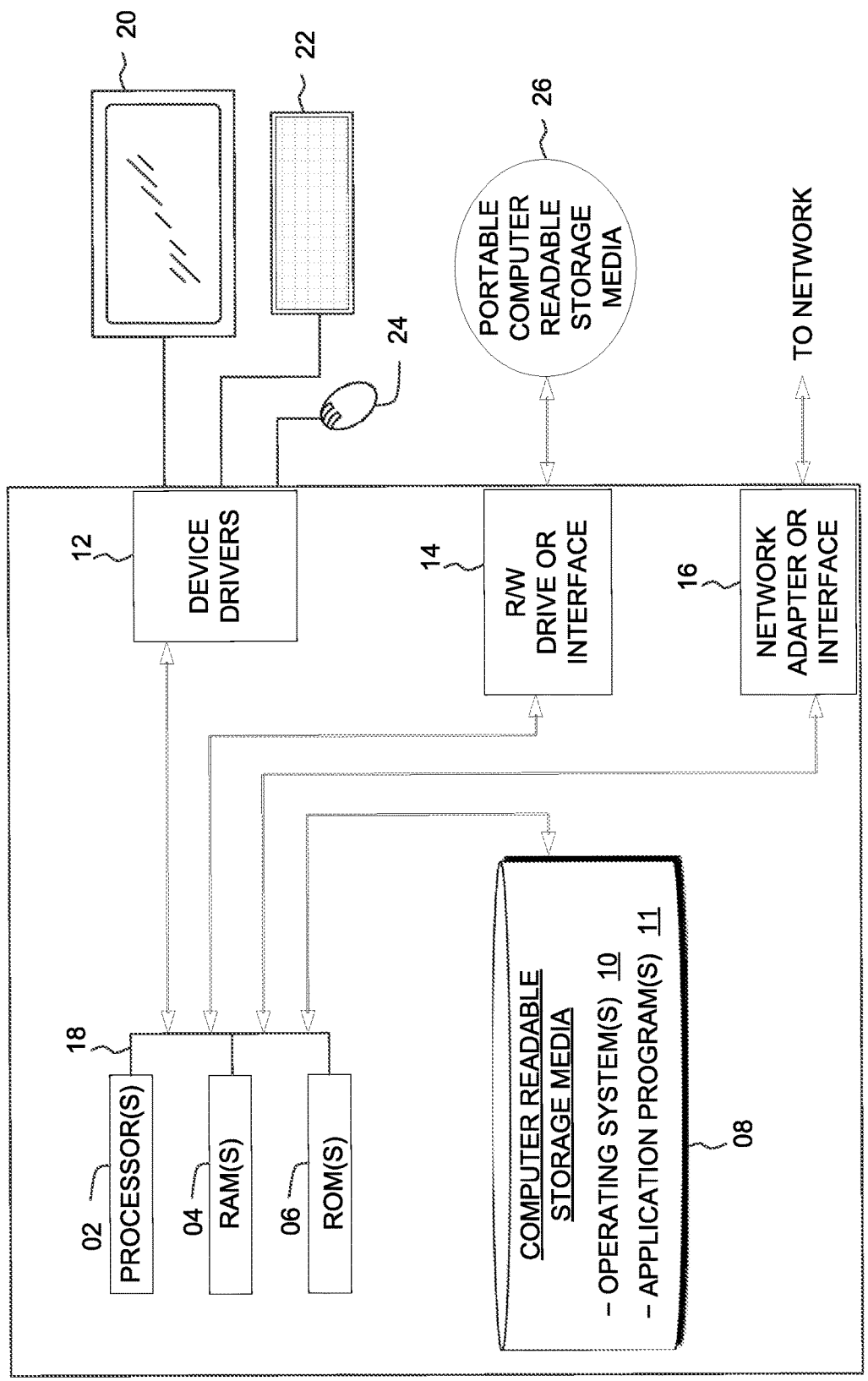
FIG. 4 depicts an exemplary block diagram depicting the hardware components of the meeting participation evaluation system 100 of FIG. 1, in accordance with the exemplary embodiments.

FIG. 4 depicts a block diagram of devices within the meeting participation evaluation system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
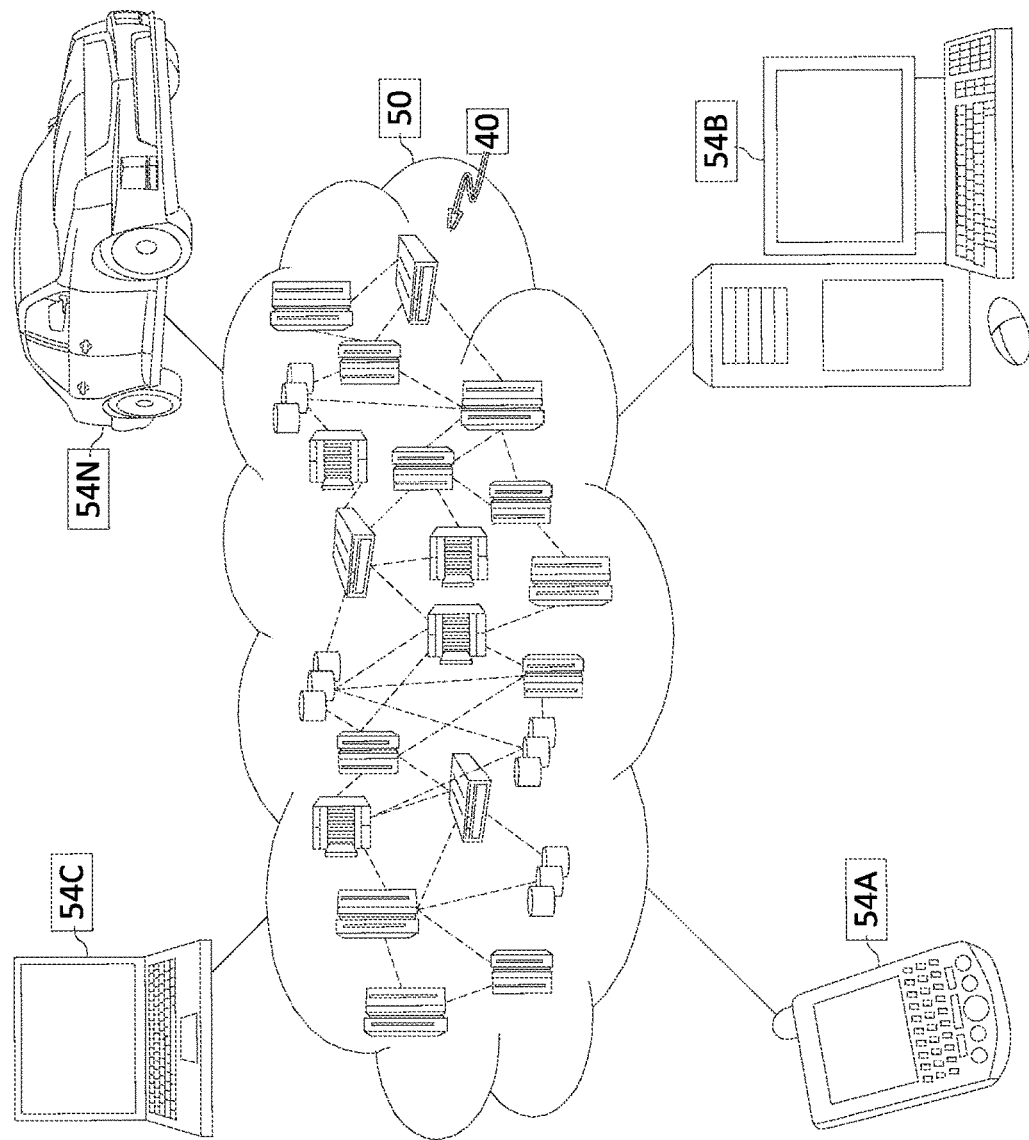
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
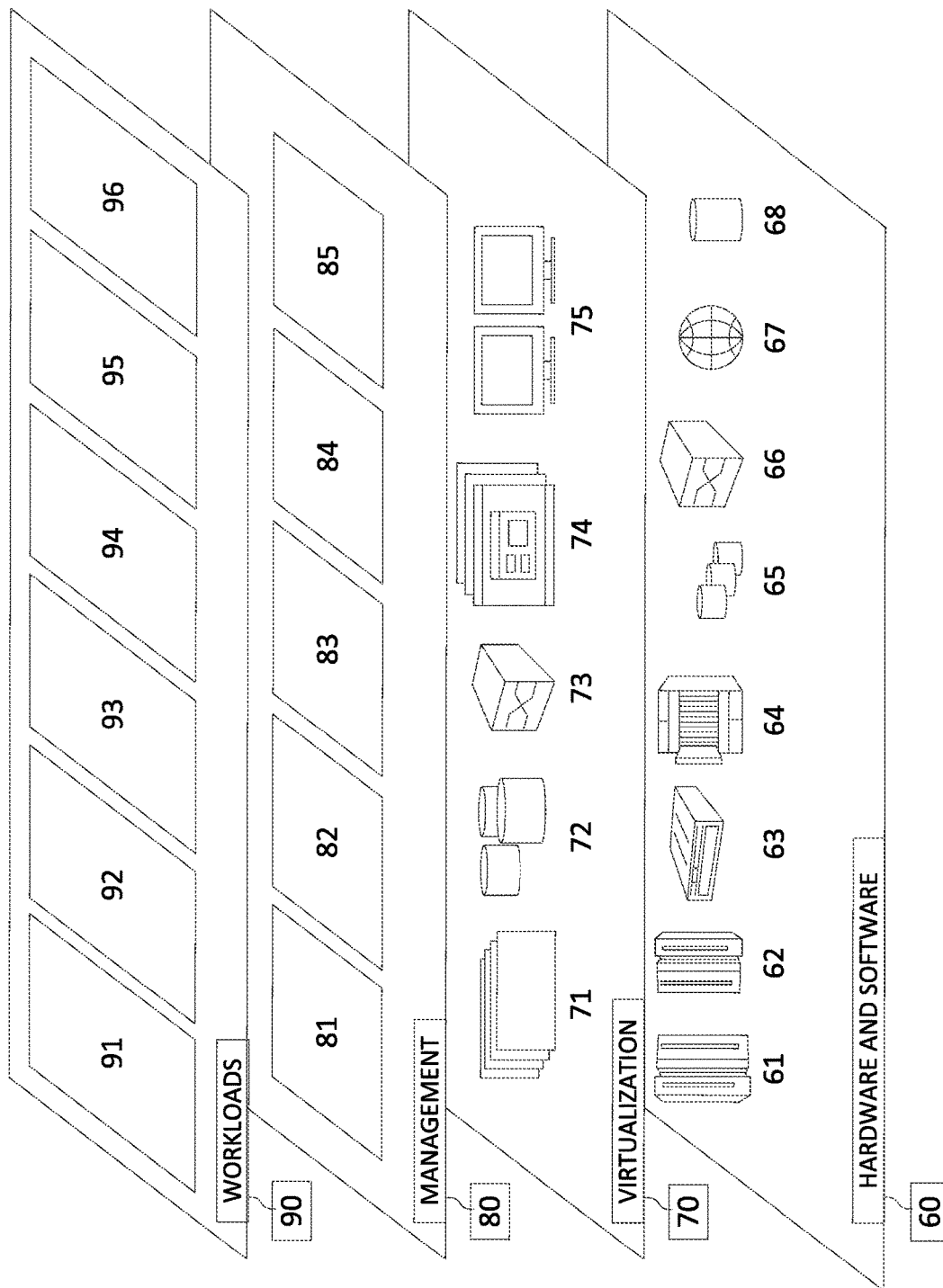
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and participation processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for determining participation levels of participants in a meeting, the method comprising:
   determining a characteristic of a first one of the participants;
   identifying a meeting topic to be discussed during the meeting;
   determining an expected participation level of the first participant based on the characteristic and the meeting topic;
   determining an actual participation level of the first participant during the meeting related to the meeting topic;
   determining whether the actual participation level of the first participant has met the expected participation level; and as a result of the actual participation level of the first participant being less than the expected participation level of the first participant, reconfiguring a visual effect of the participants to emphasize a contribution from the first participant, the visual effect raising an illumination of the first participant in a video interface of the meeting.

2. The computer-implemented method of claim 1, wherein the meeting topic is identified based on communications among the participants.

3. The computer-implemented method of claim 2, wherein the communications occur prior to the meeting.

4. The computer-implemented method of claim 1, wherein the characteristic is included in a profile associated with the first participant.

5. The computer-implemented method of claim 1, further comprising:
  when the actual participation level is less than the expected participation level, generating a notification indicating that the first participant is expected to contribute further toward the meeting topic.

6. The computer-implemented method of claim 1, further comprising:
  generating a participant list of the participants, the participation list including an identity of the first participant and the actual participation level of the first participant.

7. The computer-implemented method of claim 1, wherein the characteristic is an expertise in a topic.

8. A computer program product for determining participation levels of participants in a meeting, the computer program product comprising:
  one or more non-transitory computer-readable storage media and program instructions stored on the one or more non-transitory computer-readable storage media capable of performing a method, the method comprising:
    determining a characteristic of a first one of the participants;
    identifying a meeting topic to be discussed during the meeting;
    determining an expected participation level of the first participant based on the characteristic and the meeting topic;
    determining an actual participation level of the first participant during the meeting related to the meeting topic;
    determining whether the actual participation level of the first participant has met the expected participation level; and
    as a result of the actual participation level of the first participant being less than the expected participation level of the first participant, reconfiguring a visual effect of the participants to emphasize a contribution from the first participant, the visual effect raising an illumination of the first participant in a video interface of the meeting.

9. The computer program product of claim 8, wherein the meeting topic is identified based on communications among the participants.

10. The computer program product of claim 9, wherein the communications occur prior to the meeting.

11. The computer program product of claim 8, wherein the characteristic is included in a profile associated with the first participant.

12. The computer program product of claim 8, wherein the method further comprises:
  when the actual participation level is less than the expected participation level, generating a notification indicating that the first participant is expected to contribute further toward the meeting topic.

13. The computer program product of claim 8, wherein the method further comprises:
  generating a participant list of the participants, the participation list including an identity of the first participant and the actual participation level of the first participant.

14. The computer program product of claim 8, wherein the characteristic is an expertise in a topic.

15. A computer system for determining participation levels of participants in a meeting, the computer system comprising:
  one or more computer processors, one or more computer-readable storage media, and program instructions stored on one or more of the computer-readable storage media for execution by at least one of the one or more processors capable of performing a method, the method comprising:
    determining a characteristic of a first one of the participants;
    identifying a meeting topic to be discussed during the meeting;
    determining an expected participation level of the first participant based on the characteristic and the meeting topic;
    determining an actual participation level of the first participant during the meeting related to the meeting topic;
    determining whether the actual participation level of the first participant has met the expected participation level; and
    as a result of the actual participation level of the first participant being less than the expected participation level of the first participant, reconfiguring a visual effect of the participants to emphasize a contribution from the first participant, the visual effect raising an illumination of the first participant in a video interface of the meeting.

16. The computer system of claim 15, wherein the meeting topic is identified based on communications among the participants.

17. The computer system of claim 16, wherein the communications occur prior to the meeting.

18. The computer system of claim 15, wherein the characteristic is included in a profile associated with the first participant.

19. The computer system of claim 15, wherein the method further comprises:
  when the actual participation level is less than the expected participation level, generating a notification indicating that the first participant is expected to contribute further toward the meeting topic.

20. The computer system of claim 15, wherein the method further comprises:
  generating a participant list of the participants, the participation list including an identity of the first participant and the actual participation level of the first participant.

* * * * *